Aug. 11, 1964 J. E. BRIDGES ETAL 3,144,580

VERTICAL DEFLECTION SYSTEM

Filed March 21, 1960 2 Sheets-Sheet 1

Inventors
Jack E. Bridges
Zbigniew Wiencek
By: Hofgren, Brady, Wegner, Allen & Stellman
Attorneys Inventors
Jack E. Bridges
Zbigniew Wiencek.
By: Hofgren, Brady, Wegner, Allen & Stellman
Attorneys

United States Patent Office 3,144,580

Patented Aug. 11, 1964

3,144,580
VERTICAL DEFLECTION SYSTEM
Jack E. Bridges, Park Ridge, and Zbigniew Wiencek, Rolling Meadows, Ill., assignors to Warwick Electronics Inc., a corporation of Delaware
Filed Mar. 21, 1960, Ser. No. 16,578
10 Claims. (Cl. 315—27)

Figure 1A:
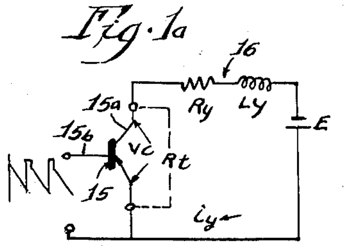

This invention is concerned with an amplifier circuit and more particularly with a transistorized sweep amplifier circuit for the vertical deflection system of a television receiver.

This application relates to improvements over the circuit disclosed and claimed in copending Bourget application Serial No. 722,591, filed March 19, 1958, and assigned to the assignee of this invention, now Patent 3,034,013. In the Bourget application, a circuit is disclosed which shortens the retrace time needed for a class B push-pull sweep amplifier circuit. This application discloses specific relationships and refinements for such a circuit.

The standard television signal transmitted in accordance with FCC regulations includes a vertical blanking signal having a period which is within certain specified limits. The initial portion of the vertical blanking signal synchronizes the operation of the vertical oscillator in the receiver, effecting production of the saw-tooth driving potential for the vertical system. During the blanking period the current through the yoke must be reversed and the next sweep started. If the sweep starts slightly before the end of the blanking period, the effect is not particularly detrimental as the sweep amplitude and position can be adjusted to center the picture on and fill the screen. If, however, the sweep starts too late, a portion of the top of the picture may be lost.

One feature of the invention is the provision in a sweep amplifier circuit, of a source of driving potential having a generally sawtooth wave form, a pair of transistors driven alternately from said source and having output elements connected with a deflection coil, the driving potential rendering one of the transistors conductive during retrace. A diode is connected with the output element of such one transistor and prevents conduction therethrough during at least a portion of the retrace, and a capacitor is connected with the system forming a resonant circuit with the deflection coil at a frequency having a half period no greater than the retrace period of the driving potential. Preferably, the resonant frequency selected to maximize the amplitude of the recovery or resonant current, increasing the efficiency of the system, so long as the half period at that frequency is not excessive as compared with the vertical blanking time.

Another feature is that the source of energizing potential for the transistors is such that the one transistor (which is driven conductively during retrace) is operated from a higher potential than the other. The ratio of unbalance between the potential sources is limited primarily by the degree of decentering which may be compensated for by other simple means and from a practical standpoint is of the order of 3 to 1, that which produces a decentering effect of the order of 20%.

A further feature is the provision of a feedback connection between the output elements of the push-pull amplifier circuit and the input of the driver circuit.

Figure 2A:
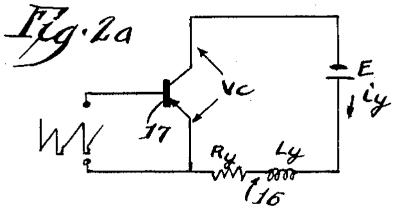
Figure 1B:
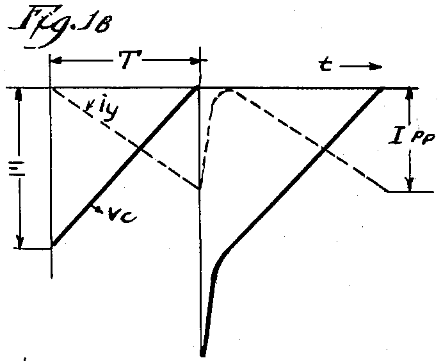
Figure 2B:
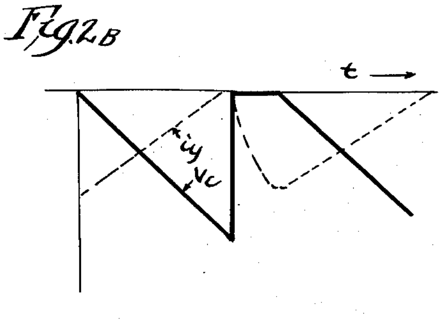
Figure 3C:
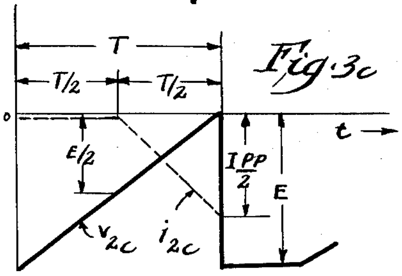
Figure 3D:
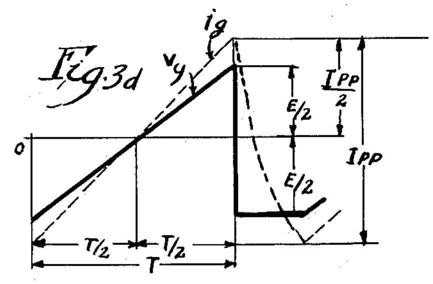
Figure 3B:
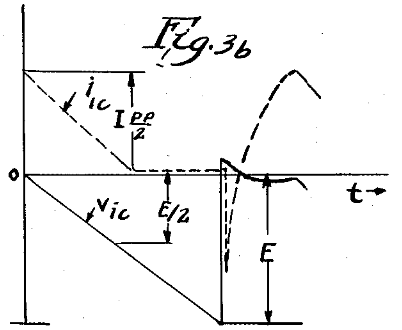
Figure 3A:
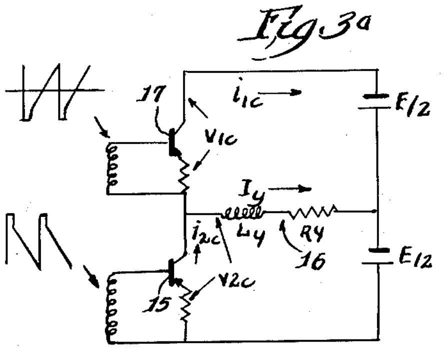
Figure 4C:
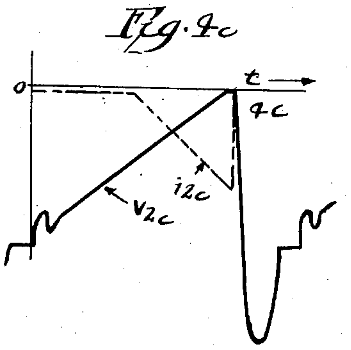
Figure 4D:
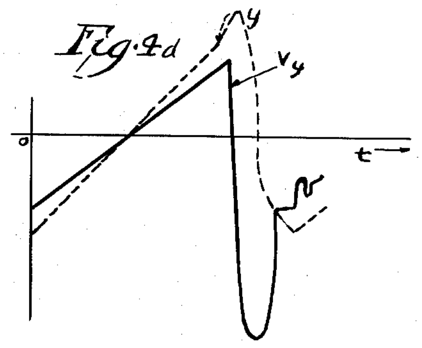
Figure 4B:
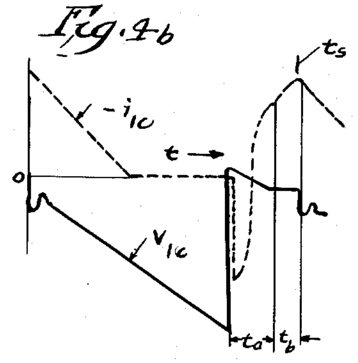
Figure 4A:
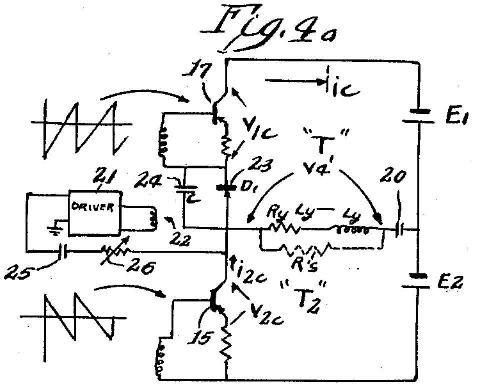
Figure 5:
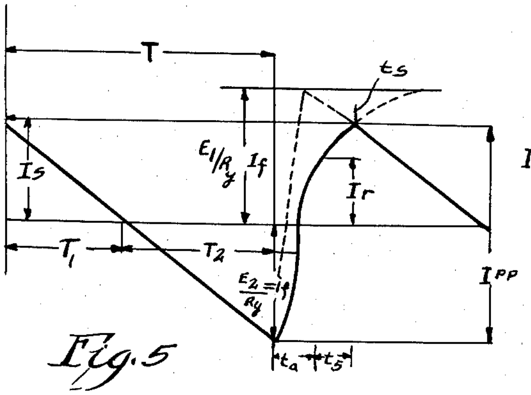
Figure 6:
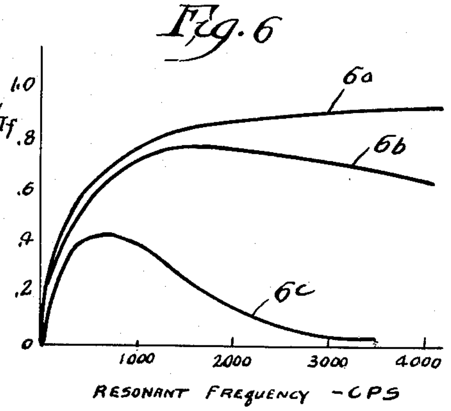

Further objects and advantages will become apparent from the following detailed description taken in connection with the accompanying drawings, in which:

FIGURE 1*a* is a schematic diagram of a class A sweep amplifier circuit;

FIGURE 1*b* is a plot of current and voltage relations in the circuit of FIGURE 1*a*;

FIGURE 2*a* is a schematic circuit diagram of a second form of class A sweep amplifier circuit;

FIGURE 2*b* is a plot of current and voltage relations in the circuit of FIGURE 2*a*;

FIGURE 3*a* is a schematic circuit diagram of a basic push-pull sweep amplifier circuit;

FIGURE 3*b* is a plot of current and voltage relations in one portion of the circuit of FIGURE 3*b*;

FIGURE 3*c* is a plot of current and voltage relations in a second portion of the circuit of FIGURE 3*a*;

FIGURE 3*d* is a plot of current and voltage relations in the deflection coil of FIGURE 3*a*;

FIGURE 4*a* is a schematic circuit diagram of a system embodying the invention;

FIGURE 4*b* is a plot of current and voltage relations in a portion of the circuit of FIGURE 4*a*;

FIGURE 4*c* is a plot of current and voltage relations in another portion of the circuit of FIGURE 4*a*;

FIGURE 4*d* is a plot of current and voltage relations in the deflection coil of the circuit of FIGURE 4*a*;

FIGURE 5 is an enlarged and detailed plot of the yoke or deflection coil current in the circuit of FIGURE 4*a*; and FIGURE 6 is a curve of current relations in the system.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. For example, the circuit shown herein uses two PNP transistors. A comparable circuit using two NPN, or a circuit with one NPN and one PNP may also make use of the invention. The scope of the invention will be pointed out in the appended claims.

Present commercial television practices provide for a frame or vertical sweep repetition rate of 60 frames per second, and each frame has a period or duration of 16,700 microseconds. The standards further set the period of the blanking pulse at 5% +3%, −0%, of the period of the frame. This is a range for the blanking pulse of from 830 microseconds to 1330 microseconds. In general, the transmitted signal has a blanking period somewhat greater than the minimum 830 microseconds. In the design of a television receiver, a retrace period of the order of 600 microseconds is the normally accepted practice and, in many cases, the design is such to produce an even shorter retrace, as down to the order of 450 microseconds. The shortened retrace time improves the interlace of the frames. However, reasonably satisfactory operation can be secured with a longer retrace time, even greater than the minimum 830 microseconds for the transmitted signal.

In a television deflection system, it is extremely desirable that the retrace be completed before the end of the blanking pulse, and the start of the video information to avoid clipping the picture. In a transistorized class B push-pull circuit, one of the transistor stages must be driven in such a manner that it is conductive during the retrace period. This, as will appear below, complicates the dissipation of the energy stored in the field about the deflection yoke or coil at the end of the trace. This invention is concerned with design considerations and refinements in the circuit of the Bourget application, reducing the retrace time without impairing the linearity of the sweep or effecting a decentering of the picture which may not readily be compensated for by other suitable means, as conventional centering magnets.

The circuits of FIGURES 1*a* and 2*a* will be discussed to present the retrace problem in transistor sweep amplifier circuits in a general manner. In FIGURE 1*a*, transistor 15 has an output element 15*a* connected in a circuit with the deflection coil or yoke 16, including a resistance $R_y$ and an inductance $L_y$, and a potential source or battery E. Transistor 15 is driven by a signal applied to control element 15*b* in such a manner that the sweep current starts at zero and increases linearly. When the transistor is switched off it presents an effective resistance $R_t$ to the circuit. During retrace the current, $i_y$, decreases according to the relationship $$i_y=\left(\frac{E}{R_y}-\frac{E}{R_t+R_y}\right)e^{-\left(\frac{R_y+R_t}{L_y}\right)t}+\frac{E}{R_y+R_t} \quad (1)$$

and has a minimum value determined by the resistance of the yoke $R_y$ and the resistance of the transistor $R_t$. This circuit may be referred to as having "correct" drive.

The voltage and current relationships are plotted in FIGURE 1*b* where $I_{pp}$ is the peak-to-peak sweep current. It will be noted that the transistor is subjected to a high amplitude voltage pulse at the start of the retrace.

In FIGURE 2*a* transistor 17 is connected in a similar circuit with the deflection yoke 16 for a load, but is driven with a signal of the opposite polarity. In this situation, the sweep current starts with a high amplitude and ends at a low level when the transistor is rendered nonconductive by the driving signal. During the retrace period the current must be returned to its high initial amplitude. The transient current during retrace with this circuit is given the following relation $$i_y=\frac{E}{R_y}\left(1-e^{-\left(\frac{R_y}{L_y}\right)t}\right) \quad (2)$$

During retrace the transistor is conducting and its resistance is negligible. Thus the exponent of the logarithmic term is relatively small and the time required for the retrace is increased over that of the circuit of FIGURE 1*a*. This circuit may be referred to as having "incorrect" drive. The current and voltage relations are illustrated graphically in FIGURE 2*b*.

A push-pull circuit combining the class A circuits of FIGURES 1*a* and 2*a* is illustrated in FIGURE 3*a* with transistor 15, the lower transistor, driven in "correct" operation and transistor 17, the upper transistor, driven in "incorrect" operation. Yoke 16 is connected in push-pull relation with the two transistors. FIGURE 3*b* shows the current and voltage relations in transistor 17, while FIGURE 3*c* shows the current and voltage relations in transistor 15. FIGURE 3*d* shows the current in and voltage across the load or deflection yoke circuit. In this situation the two transistors are driven equally and are powered by sources $E/2$ of equal potential. Upper transistor 17 supplies the first half of the sweep current while lower transistor 15 supplies the second half. It will be noted that the current through transistor 17 is zero during the last half of the sweep and at the end of the sweep jumps immediately to a large negative value and then must reverse and return to the value $I_{pp}/2$ before starting the next sweep, all during the retrace period. The retrace current follows a transient similar to Expression 2 given above, and as pointed out, the exponential term of the relation requires a substantial period of time to disappear because of the low resistance in the circuit.

One possible solution to this problem is to unbalance the drives to the two transistors so that the starting current required in transistor 17 is less than half the peak-to-peak sweep current. This method, however, has its limitations as it introduces a direct current component into the yoke which has the effect of decentering the picture. An unbalance which reduce the retrace time to a reasonable value will cause a decentering which cannot readily be corrected and may introduce other problems.

Turning now to FIGURE 4*a* a circuit embodying the invention is shown. The transistor amplifiers 15 and 17 are connected and driven as in FIGURE 3*a*, with batteries E2 and E1, respectively, supplying operating potentials for them. Capacitor 20 connected in series with yoke 16, may be disregarded for the present discussion. The two transistors are supplied with a sawtooth driving signal from a driver amplifier 21 which is inductively coupled to their control elements or bases through transformer 22. Inserted in series with the connection between the output element of transistor 17 and yoke 16 is a diode 23 arranged to conduct during the sweep portion of the operating cycle and to be nonconductive during at least a portion of the retrace. Ignoring also capacitor 24, it will be seen that the current in the circuit of transistor 17 during retrace now becomes $$i_y=\frac{E_1}{R_y}\left(1-e^{-\left(\frac{R_y+R_{D1}}{L_y}\right)t}\right) \quad (3)$$

where $R_{D1}$ is the back resistance of the diode 23. The increase in the exponent of the logarithmic term indicates an increase in the rate of decay of the transient, and a reduction in the time required for the current to reverse and reach the high value necessary to start the next sweep.

A further decrease in the retrace time may be achieved by the addition of capacitor 24 which forms a tuned circuit with the inductance $L_y$ of the deflection yoke, in the manner disclosed in the aforementioned Bourget application. The current during retrace now passes through one-half cycle of an oscillation, the period indicated $t_a$ in FIGURE 4*b* and equal to $1/2f$, when $f$ is the frequency of the resonant circuit. At the end of the half-cycle of oscillation the voltage across yoke inductance $L_y$ reverses and the yoke is clamped to the battery potential through the upper transistor, the current continuing to increase exponentially during the period indicated $t_b$. This additional clamping action is necessary as the losses sustained during the resonant half cycle cause the current amplitude at the end of the resonant half cycle to be less than that required for a full reversal of the yoke current. The clamping action during the period $t_b$ must be such as to permit any decentering to be compensated in a suitable manner. The sawtooth driving signal, together with the D.C. bias circuit, having reversed the drive to transistor 17, attempts to increase the current above that determined by the transient conditions in the system. The current begins its linear decrease at the point $t_s$ where the transient current equals that required by the driving signal. The period $t_a+t_b$ is preferably less than the blanking period of the transmitted signal, to avoid clipping a portion of the picture, as discussed above, although some authors say the retrace can be greater than 600 microseconds, and times up to 2000 microseconds have been proposed.

FIGURE 4*c* shows the current and voltage relations in the lower transistor 15, while FIGURE 4*d* shows the current in and voltage across the yoke.

The drive to the two transistors may be unbalanced to further reduce the retrace time, and it has been found that a conduction ratio of 4 to 5, with upper transistor 17 conducting the lesser period, results in improved retrace time with decentering that can adequately be compensated by centering magnets.

Turning now to FIGURE 5, the composite wave form of yoke current is illustrated in more detail, it being assumed that $E_1=E_2$. During the first portion of the retrace, the resonant current reversal period $t_a$, $$i_y\cong\left(e^{-\frac{R_y}{2L_y}}\right)I_t\cos\omega t \quad (4)$$

where $$I_t=\frac{E_2}{R_y}$$

the current through the yoke at the end of the sweep. The current at the end of the resonant half cycle is designated $I_r$. During the clamping portion, $t_b$, of the retract cycle, $$i_y = I_f - (I_f - I_s)e^{-\frac{R_y}{L_y}t} \quad (5)$$

where $I_s$ is the starting current required for the sweep. As pointed out above, $I_r$ is less than $I_s$ (or $I_f$) as a result of losses in the system. At the end of the resonant half cycle the yoke current continues to rise in an exponential manner until it reaches $I_s$ and the succeeding sweep commences. The theoretical current resulting from the sawtooth driving signal is indicated in broken lines.

The ratio of $I_r$ to $I_f$, which determines the clamping time required, varies with resonant frequency of the system. It is desirable to make this ratio as large as possible, reducing time $t_b$ and the total retrace time. The ratio of $I_r$ to $I_f$ may be expressed as $$\frac{I_r}{I_f} = e^{-\pi\left(\frac{R_y}{2\omega L} + \frac{\omega L}{2R_p}\right)} \quad (6)$$

where $\omega$ is $2\pi f$, and $R_p$ is the equivalent shunt resistance seen by the yoke, including the back resistance of diode 23 and its associated circuit, the cut off resistance of transistor 15, and the iron and eddy current losses in the deflection yoke. An oscillatory transient (shown in broken lines, in FIGURE 5) occurs at the start of the sweep; and is eliminated by shunting the deflection yoke with a further resistance $R_s$, shown in broken lines, FIGURE 4*a*, adding to $R_p$.

In FIGURE 6, a family of curves for the ratio of $I_r/I_f$ are plotted as a function of frequency, *f*, for various values of $R_p$. Curve 6*a* represent a theoretical situation without circuit losses, $R_p$=00; 6*b*, $R_p$=1000 ohms; and 6*c*, $R_p$=100 ohms. In each curve, $L_y$=8 millihenrys; and $R_y$=8 ohms. For finite values of $R_p$ it will be seen that the ratio $I_r/I_f$ passes through a maximum or optimum point and then decreases, as the frequency increases.

The selection of the resonant frequency is important to the efficient operation of the system, and the optimum frequency is in the vicinity of the maximum point of $I_r/I_f$, $$f \text{ optimum} = \frac{1}{2\pi}\sqrt{\frac{R_y R_p}{L_y^2}} \quad (7)$$

the frequency should not be less than the frequency whose half period is 600 microseconds ($f$=825 c.p.s.) the standard retrace time, although operation may be satisfactory at frequencies as low as 375 c.p.s., where the half period is 1330 microseconds, the maximum blanking pulse period. At least with higher values of $R_p$, as $R_p$>300 ohms, an increase of the resonant frequency to several times the optimum is feasible, and although reducing the ratio $I_r/I_f$, shorten the period $f_a$ resonant current reversal. The curves of FIGURE 6 are for a specific circuit with certain values of $L_y$ and $R_y$. With other values for these circuit elements, the optimum frequencies for retrace resonation, with various value of equivalent shunt resistance, $R_p$, may differ from the values indicated by the plot of FIGURE 6. In summary, however, the minimum useable frequency is determined by the length of the vertical blanking pulse of the transmitted signal, with present standards, a maximum of 1330 microseconds, a retrace frequency of 375 c.p.s. The maximum frequency may be of the order of five times the optimum $I_r/I_f$ max. frequency, $$f \text{ max.} = \frac{5}{2\pi}\sqrt{\frac{R_y R_p}{L_{y2}}} \quad (8)$$

For the system illustrated in the application, the resonant frequency may be between 375 c.p.s. and about 4000 c.p.s. However, $f$ optimum for $R_p$=100 ohms is approximately 510 c.p.s., and in practice the resonant frequency will not be selected much below this.

A further improvement in the retrace time may be effected by unbalancing the potential sources so that a source $E_1$ supplying transistor 17 has a higher potential than the source $E_2$ supplying transistor 15. This increases the rate of the exponential current rise during period $t_b$ so that the yoke current reaches $I_s$ faster. One limitation on this unbalance is that the value $E_2/R_y$ be adequate to provide a full sweep. A ratio of 3 to 1 has been found to be satisfactory. The unbalance of the operating potentials may be achieved by using the different batteries or by the insertion of capacitor 20 in series with the yoke. This capacitor assumes a charge which adds to the potential of $E_1$ and subtracts from that of $E_2$.

It should be noted that this unbalance of the power supply potentials provide a decentering action which is opposite in effect to the decentering caused by unbalancing the drives to the two transistors. Accordingly, the two unbalanced conditions to a certain extent compensate for each other and reduce the decentering problem. As pointed out above, the decentering should not exceed an amount which may easily be compensated by other means. With present centering magnets, a decentering of the order of 20% is not excessive.

A positive feedback circuit including capacitor 25 connected in series with a variable resistor 26 is connected between the output elements of transistors 15 and 17 and the input of driver amplifier 21. Variable resistor 26 provides a linearity control which compensates for any nonlinearity introduced by the unbalanced driving and operating potential conditions.

We claim:

1. In a push-pull, class B sweep amplifier circuit for a television receiver, adapted to receive a signal including a blanking pulse for the sweep retrace period: a source of driving potential, the driving potential having a generally sawtooth wave form including a sweep portion and a retrace portion; a pair of transistors having control elements connected with said source and driven alternatively thereby during said sweep portion of said sawtooth wave, the driving potential rendering one of said transistors conductive during retrace, said transistors having output elements; a deflection coil connected with the output elements of said transistors; a diode connected with the output element of said one transistor and preventing conduction during at least a portion of the retrace; and a capacitor connected with said deflection coil and forming a tuned circuit therewith at a frequency having a half period no greater than the period of the blanking pulse of the received signal, said frequency being less than $$\frac{5}{2\pi}\sqrt{\frac{R_y R_p}{L_y^2}}$$

where $R_y$ is the resistance of the deflection coil, $L_y$ is the inductance of the deflection coil and $R_p$ is the equivalent shunt resistance presented to the deflection coil.

2. The sweep amplifier circuit of claim 1, wherein the frequency of said tuned circuit is of the order of $$\frac{1}{2\pi}\sqrt{\frac{R_y R_p}{L_y^2}}$$

3. In a push-pull, class B sweep amplifier circuit: a source of driving potential, the driving potential having a generally sawtooth wave form including a sweep portion and a retrace portion; a pair of transistors having control elements connted with said source and driven alternatively thereby during said sweep portion of said sawtooth wave, the driving potential rendering one of said transistors conductive during retrace, said transistors having output elements; a deflection coil connected with the output elements of said transistors; a diode connected with the output element of said one transsistor and preventing conduction during at least a portion of the retrace; a capacitor connected with said circuit and forming a tuned circuit with said deflection coil; and a source of energizing potential for each of said transsistors, the energizing potential for said one transistor being greater than that for the other.

4. The sweep amplifier of claim 3, wherein the unbalance of the energizing potentials is no more than three to one.

5. In a push-pull, class B sweep amplifier circuit: a source of driving potential, the driving potential having a generally sawtooth wave form including a sweep portion and a retrace portion; a pair of transistors having control elements connected with said source and driven alternatively thereby during said sweep portion of said sawtooth wave, the driving potential rendering one of said transistors conductive during retrace, said one transistor being driven for a lesser period than the other, said transistors having output elements; a deflection coil connected with the output elements of said transistors; a diode connected with the output element of said one transistor and preventing conduction during at least a portion of the retrace; and a source of energizing potential for each of said transistors, the energizing potential for said one transistor being greater than that for the other.

6. The sweep amplifier of claim 5, wherein the unbalance of the drives to said transistors and of the energizing potentials for said transistors producing current flow in said deflection coil during said sweep portion of said wave which in one direction is no greater than three times the current flow in the opposite direction.

7. In a push-pull, class B sweep amplifier circuit: a source of driving potential, the driving potential having a generally sawtooth wave form including a sweep portion and a retrace portion; a pair of transistors having control elements connected with said source and driven alternatively thereby during said sweep portion of said sawtooth wave, the driving potential rendering one of said transistors conductive during retrace, said transistors having output elements; a deflection coil connected with the output elements of said transistors; a diode connected with the output element of said one transistor and preventing conduction during at least a portion of the retrace; capacitor means connected with said circuit forming a resonant circuit with said deflection coil; and a feedback network connected between the output elements of said transistors and said source of driving potential.

8. In a push-pull, class B sweep amplifier circuit for a television receiver, adapted to receive a signal including a blanking pulse for the sweep retrace period: a source of driving potential, the driving potential having a generally sawtooth wave form including a sweep portion and a retrace portion; a pair of transistors having control elements connected with said source and driven alternatively thereby during said sweep portion of said sawtooth wave, the driving potential rendering one of said transistors conductive during retrace, said transistors having output elements; a deflection coil connected with the output elements of said transistors; a diode connected with the output element of said one transistor and preventing conduction during at least a portion of the retrace; and capacitor means connected with said circuit forming a resonant circuit with said deflection coil at a frequency having a half period of no greater than the blanking pulse of the received signal; and a feedback network comprising a series connected capacitor and variable resistor connected between the output elements of said transistors and said driving potential source.

9. In a push-pull, class B sweep amplifier circuit for a television receiver, adapted to receive a signal including a blanking pulse for the sweep retrace period: a source of driving potential, the driving potential having a generally sawtooth wave form including a sweep portion and a retrace portion; a pair of transistors having control elements connected with said source and driven alternatively thereby during said sweep portion of said sawtooth wave, the driving potential rendering one of said transistors conductive during retrace, said transistors having output elements; a deflection coil connected with the output elements of said transistors; a diode connected with the output element of said one transistor and preventing conduction during at least a portion of the retrace; and a capacitor connected in series with said deflection coil and forming a resonant circuit at a frequency having a half period no greater than the period of the blanking pulse of the received signal; and a positive feedback network connected between the output elements of said transistors and said source of driving potential.

10. In a push-pull, class B sweep amplifier circuit: a source of driving potential, the driving potential having a generally sawtooth wave form including a sweep portion and a retrace portion; a pair of transistors having control elements connected with said source and driven alternatively thereby during said sweep portion of said sawtooth wave, the driving potential rendering one of said transistors conductive during retrace, said transistors having output elements; a deflection coil connected with the output elements of said transistors; a diode connected with the output element of said one transistor and preventing conduction during at least a portion of the retrace; a capacitor connected with said deflection coil and forming a tuned circuit therewith at a frequency of the order of $$\frac{1}{2\pi}\sqrt{\frac{R_y R_p}{L_y^2}}$$

where $R_y$ is the resistance of the deflection coil, $L_y$ is the inductance of the deflection coil and $R_p$ is the equivalent shunt resistance presented to the deflection coil; and a source of energizing potential for each of said transistors, the energizing potential for said one transistor being of the order of three times that for the other.

References Cited in the file of this patent

UNITED STATES PATENTS

| | | |
|---|---|---|
| 2,762,870 | Sziklai | Sept. 11, 1956 |
| 2,802,071 | Lin | Aug. 6, 1957 |
| 2,814,736 | Hamilton | Nov. 26, 1957 |
| 2,839,620 | Waldhauer | June 17, 1958 |
| 2,924,744 | Paynter | Feb. 9, 1960 |
| 2,954,504 | Saudinaitis | Sept. 27, 1960 |
| 2,958,003 | Marshall | Oct. 25, 1960 |
| 3,034,013 | Bourget | May 8, 1962 |